UNITED STATES PATENT OFFICE.

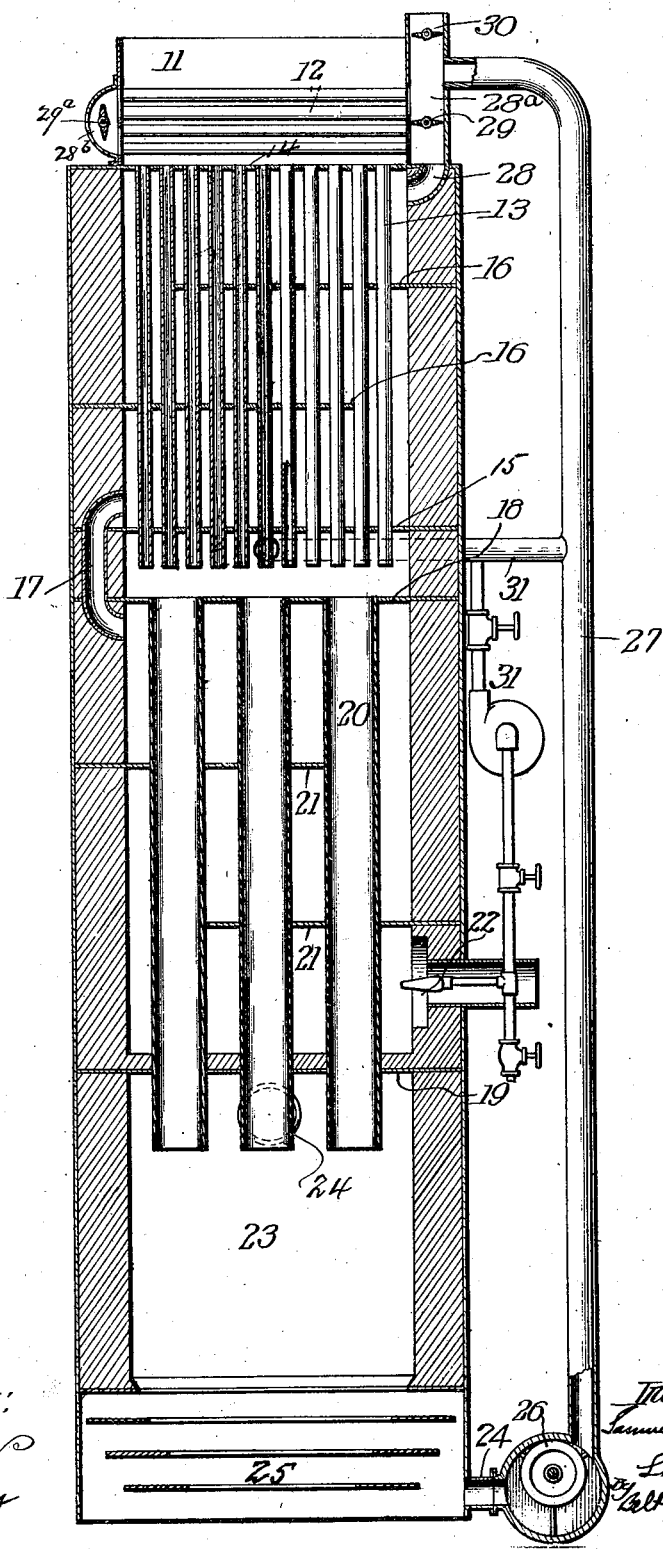

SAMUEL M. DARLING, OF CHICAGO, ILLINOIS.

METHOD OF MAKING GAS.

1,157,089.      Specification of Letters Patent.      Patented Oct. 19, 1915.

Application filed October 5, 1912. Serial No. 724,036.

*To all whom it may concern:*

Be it known that I, SAMUEL M. DARLING, a citizen of the United States, and resident of Chicago, in the county of Cook and State of Illinois, have invented certain new and useful Improvements in Methods of Making Gas, of which the following is a specification.

While the present invention is capable of making gas from carbonaceous material generally, it is particularly designed for making gas from lignite.

In the first step of the process the entrained and occluded moisture is removed from the lignite; secondly, the volatile constituents are withdrawn, in the forms of fixed gas and condensable hydrocarbon and ammoniacal liquor vapors; and, thirdly, the carbon residue is transformed into gas by means of a gas producer.

The fixed gases generated in the retorts in the second, or carbonizing section, are withdrawn by an exhauster and suitably treated and used for illuminating, fuel or power purposes, or all or a portion of them may be passed to the combustion chamber of this section and there burned to furnish the heat necessary to carry on the process of distillation. The resulting flue gases from the combustion chamber of the distilling section are used to heat the lignite and measurably drive off its contained moisture as it passes through the drying section. These flue gases are made to contact with tubes through which the lignite is passing, or they may be passed along in intimate contact with or through a layer of this lignite itself, or combinations of these methods may be used. The residual carbon is passed immediately, in an incandescent state, from the carbonizing section into the gas producer. A great advantage is gained in passing the fuel into a gas producer in a very hot condition instead of in a cold state as is the usual practice. The saving of fuel necessary to carry on the producer process is large and I am enabled to use a much greater amount of steam and carbon dioxid than can ordinarily be done, resulting in a much richer gas, and lower temperature and better control of the producer fire. The use of a comparatively large volume of carbon dioxid obviates the necessity of generating a like volume of carbon dioxid in the producer fire.

As indicated above, the flue gases and the moisture or steam driven off from the lignite by them, as they travel through the drying section, pass off together. In generating the producer gas, these flue gases, containing approximately fifteen per cent. of carbon dioxid, together with the steam from the lignite, are withdrawn by means of an exhauster and passed through the combustion zone of the gas producer, resulting in the economies noted in the last preceding paragraph. The producer gas formed in the gas producer and the illuminating gas generated in the carbonizing section may be withdrawn from their respective generating units of the apparatus by the same exhauster and passed to a holder, where they will become mixed and constitute an exceedingly good power or fuel gas, a portion of which may be led to the combustion chamber of the distilling section and there burned to supply the heat necessary to carry on the drying and distilling processes and the balance used for various commercial purposes,—principally in gas engines operating dynamos to generate electricity. The gases and vapors distilled from the lignite in the carbonizing section may be withdrawn and passed with the flue gases and steam through the combustion zone of the producing section, thus fixing as permanent gases the hydro-carbon vapors, the most of which would otherwise condense as tar. This gives a richer and larger volume of producer gas and obviates the necessity for condensing and scrubbing apparatus to remove the tar from the gas.

Apparatus by means of which my improved method may be carried out is shown in the accompanying drawing which presents a vertical longitudinal sectional view of the apparatus.

Referring more particularly to the drawings, it will be seen that the mechanism by which my improved method may be carried out is composed of a rectangular vertically-arranged bench of retorts having heavy walls 10. At the top I mount a hopper 11 having a series of staggered transversely arranged angle-bars 12 located therein, the two legs of the angles presenting downwardly.

The lignite in a comminuted state is placed in this hopper and descends by gravity past the angle bars and into a series of tubes 13, vertically arranged, their upper ends being mounted in a flue sheet 14, which completely closes the top of the bench. The tubes are held at the bottom by a second flue sheet 15, which is also closed except for the openings through which the tubes 13 extend. I also provide baffles 16 arranged between the upper and lower flue sheets in order that the products of combustion may follow a tortuous path in their escape and thus contact evenly all the tubes. A by-pass 17 is provided in the wall of the structure and provides communication with the combustion chamber of the bench. The carbonizing chamber is indicated between flue sheets 18, 19, at the top and bottom respectively. A series of retorts 20, oval or oblong in cross-section, are vertically arranged in the carbonizing section, these tubes being considerably larger in cross-sectional area than the tubes 13. Baffles 21 are likewise provided in this section. Openings 22 are provided, within which burners for gas, oil or other combustible element may be inserted. Arranged below the sections just described is a gas producer 23 having a conduit 24 leading therefrom through which the combustible gases generated are withdrawn. A grate 25 of any approved form is arranged at the bottom. A fan or blower 26, communicates with the lower portion of the gas producer, a conduit 27 connecting the blower with the upper end of the drying section. A by-pass 28 is entered just below the upper flue sheet 14, this by-pass communicating with a short stack 28$^a$, within which are provided suitable dampers 29, 30. On the opposite side of the hopper I may provide a by-pass 28$^b$, having located therein a damper or valve 29$^a$. As shown, the damper 29 is closed and the damper 29$^a$ open. By operating the blower with the dampers in the position shown, the steam and carbon dioxid on their way to the stack are drawn into the gas producer and assists in the producer process. At a point just above the tubes 20 a conduit 31 is located through which the volatile matter distilled from the coal in the carbonizing section may be withdrawn. The volatile matter thus withdrawn may be passed through condensing and scrubbing apparatus (not shown) in order to remove the tar, or it may be passed through the combustion zone of the producer section, thus converting the tar into permanent gas, enriching and increasing the volume of producer gas. By this method the scrubbing and cooling is unnecessary. In other words, the exhaust force acting on the producer to withdraw the evolved gases may be increased sufficiently to also draw therethrough the gases and vapors from the drying and carbonizing sections.

The method followed may preferably be shown as follows: The lignite is deposited in the hopper 11 and passing by the angles 12 enters the flues or tubes 13. The bench having been started in operation by the ignition of gases or other fuel at the point 22, the products of combustion will pass upward through the by-pass 17, around the baffles 16, thus contacting the pipes and heating the coal as it passes therethrough. This removes a quantity of water and preliminarily dries the product. The lignite passes from the flues 13 to the large flues 20. It will be understood that the lignite at this point is in a dry and finely divided condition and that therefore it will readily pass from the smaller tubes 13 into the larger tubes 20 by gravity even though the smaller tubes may not in each instance be in register with the larger tubes. A more intense heat is encountered at this point and the coal is distilled, the gases and vapors being drawn off through the conduit 31. In this carbonizing section the material is heated to a point of incandescence and would, if exposed to the air, be consumed. However, in one contemplated step of the method, such product is passed immediately from the flues 20 to the gas producer 23 in a state of incandescence. While in this portion of the retort, carbon-dioxid and steam are blown therethrough by means of the fan 26 evolving producer gas which is removed through the conduit 24.

It will be seen that by the method employed the lignite is treated in a practically continuous process, the steam and carbon-dioxid driven off in the drying process being used in the gas-producing process; a quantity of the combustible gas driven off in the carbonizing section is returned to the burners to furnish the heat for further carbonizing, the balance of which may be used as desired, or it may be passed through combustion zone of producer. The producer gas will be properly washed and used as fuel or in gas engines for the production of power.

It will be seen that my method is very simple and may be carried out with many forms of apparatus other than that shown in the drawings. I do not, therefore, limit myself to the employment of any specific apparatus in carrying out the method of my invention.

I claim:

1. The herein described method of treating carbonaceous material to be fed to a gas producer which consists in heating the material to vaporize the occluded moisture by heating means other than the gas producer, incandescing the material to carbonize the same by heating means other than the gas producer, feeding the carbonized material in an incandescent condition to the gas producer, and drawing off the produced gas.

2. The herein described method of making gas, which consists in heating carbonaceous material to be fed to a gas producer to vaporize the occluded moisture by heating means other than the gas producer, incandescing the material to carbonize the same by heating means other than the gas producer, drawing off the volatile matter and fixed gases, feeding the carbonized material in an incandescent condition to a gas producer, conducting the vaporized moisture, volatile matter and fixed gases to the combustion zone of the gas producer, and drawing off the produced gas.

3. The herein described method of making gas which consists in externally heating a closed chamber containing carbonaceous material to vaporize and drive off the moisture in such carbonaceous material, conducting the dried material to a second chamber and externally heating the second chamber to raise the material to incandescence and thereby carbonizing the same, drawing off the volatile matter and fixed gases produced by the carbonizing step, feeding the incandescent carbonized material into a gas producer chamber, conducting a portion of the vaporized moisture and fixed gases to the combustion zone of the gas producer, and drawing off the produced gas.

Signed at Chicago, in the county of Cook, and State of Illinois, this 3rd day of October, A. D. 1912, in the presence of the following witnesses.

SAMUEL M. DARLING.

Witnesses:
T. D. BUTLER,
CHAS. J. MURRAY.